(12) United States Patent
Zhang et al.

(10) Patent No.: US 10,645,878 B2
(45) Date of Patent: May 12, 2020

(54) GARDEN TOOL POWER SYSTEM WITH AUTOMATIC WALKING FUNCTION

(71) Applicant: Changzhou Globe Co., Ltd., Changzhou, Jiangsu (CN)

(72) Inventors: Wei Zhang, Changzhou (CN); Xiaodong Guan, Changzhou (CN)

(73) Assignee: Changzhou Globe Co., Ltd., Changzhou, Jiangsu (CN)

(*) Notice: Subject to any disclaimer, the term of this patent is extended or adjusted under 35 U.S.C. 154(b) by 272 days.

(21) Appl. No.: 15/753,025

(22) PCT Filed: Mar. 23, 2016

(86) PCT No.: PCT/CN2016/077174
§ 371 (c)(1),
(2) Date: Feb. 15, 2018

(87) PCT Pub. No.: WO2017/028530
PCT Pub. Date: Feb. 23, 2017

(65) Prior Publication Data
US 2018/0242526 A1    Aug. 30, 2018

(30) Foreign Application Priority Data
Aug. 18, 2015  (CN) .......................... 2015 1 0504564

(51) Int. Cl.
*A01D 69/06* (2006.01)
*A01D 69/08* (2006.01)
(Continued)

(52) U.S. Cl.
CPC ............. *A01D 69/06* (2013.01); *A01D 34/68* (2013.01); *A01D 34/6812* (2013.01);
(Continued)

(58) Field of Classification Search
CPC ................ A01D 34/68; A01D 34/6806; A01D 34/6812; A01D 2034/6837; A01D 69/02;
(Continued)

(56) References Cited

U.S. PATENT DOCUMENTS 2,194,228 A * 3/1940 Jex ........................ F16D 41/063
                                                              192/41 R
3,461,746 A * 8/1969 Schwerdhofer ......... F16D 43/18
                                                              475/258

(Continued)

FOREIGN PATENT DOCUMENTS

CN        203492380 U      3/2014
CN        203851503 U      10/2014
(Continued)

OTHER PUBLICATIONS

Chinese Patent Office, Search Report in CN201510504564, dated Oct. 25, 2016.

(Continued)

*Primary Examiner* — Barry Gooden, Jr.
(74) *Attorney, Agent, or Firm* — Dorton & Willis, LLP

(57) ABSTRACT

A garden tool power system comprises a motor, a reducer and a transmission shaft. The motor transmits the power to the transmission shaft through the reducer to drive wheels on the transmission shaft to rotate. The reducer comprises a pinion connected to an output end of the motor and a gear engaged with the pinion. The transmission shaft includes left and right shafts connected with each other through a connecting shaft. The gear mounted on the connecting shaft has at least two guiding rods transversely located thereon and two centrifugal blocks located between the guiding rods. Each guiding rod has a spring surrounded therearound and each spring located between two centrifugal blocks has two opposite ends respectively abutted against the corresponding portions of the centrifugal blocks. A fixing sleeve provided (Continued)

on the periphery of the centrifugal blocks is mounted on the transmission shaft and has buckle structures matching with the centrifugal blocks.

7 Claims, 4 Drawing Sheets

(51) Int. Cl.
    *A01D 34/68*     (2006.01)
    *F16D 11/16*     (2006.01)
    *F16D 13/16*     (2006.01)
    *F16D 43/16*     (2006.01)
    *F16D 43/18*     (2006.01)
    *A01D 69/02*     (2006.01)
    *F16H 1/06*     (2006.01)
    *F16H 57/02*     (2012.01)

(52) U.S. Cl.
    CPC ............. *A01D 69/02* (2013.01); *A01D 69/08* (2013.01); *F16D 11/16* (2013.01); *F16D 43/18* (2013.01); *F16H 1/06* (2013.01); *F16H 57/02* (2013.01)

(58) Field of Classification Search
    CPC ........ A01D 69/06; A01D 69/08; A01D 34/69; F16D 11/16; F16D 13/16; F16D 2011/004; F16D 2011/006; F16D 41/04; F16D 41/06; F16D 41/063; F16D 43/14; F16D 43/16
    See application file for complete search history.

(56) References Cited

U.S. PATENT DOCUMENTS

| | | | | |
|---|---|---|---|---|
| 3,980,165 A * | 9/1976 | Kesselmark | ............ | F16D 43/14 192/105 CE |
| 4,378,710 A * | 4/1983 | Knodel | ................... | F16D 23/06 192/114 R |
| 4,458,795 A * | 7/1984 | Norton | ................. | B62D 5/0433 180/444 |
| 6,354,978 B1 * | 3/2002 | Brackin | ................. | F16H 48/08 475/234 |
| 7,210,567 B2 * | 5/2007 | Cibien | ................. | F16D 13/025 192/48.8 |
| 8,852,057 B2 | 10/2014 | Matsumoto | | |
| 9,759,300 B2 * | 9/2017 | Barendrecht | ...... | A01D 34/6812 |
| 2001/0020565 A1 * | 9/2001 | Blanchard | ................ | F16H 7/14 192/3.54 |
| 2006/0289225 A1 * | 12/2006 | Blanchard | .............. | A01D 34/69 180/337 |
| 2007/0000348 A1 * | 1/2007 | Blanchard | .............. | A01D 34/69 74/650 |
| 2007/0272510 A1 * | 11/2007 | Kawakami | ............. | A01D 34/69 192/215 |
| 2007/0273152 A1 * | 11/2007 | Kawakami | ............. | B60L 50/00 290/17 |
| 2011/0017168 A1 * | 1/2011 | Gilpatrick | ............... | F02B 63/00 123/197.5 |
| 2011/0173941 A1 * | 7/2011 | Persson | .................. | A01D 34/74 56/17.1 |
| 2012/0066975 A1 * | 3/2012 | Hayakawa | .............. | F16D 43/02 49/324 |
| 2012/0096971 A1 * | 4/2012 | Blanchard | .............. | A01D 69/06 74/473.36 |
| 2012/0129637 A1 * | 5/2012 | Blanchard | .............. | A01D 34/69 474/116 |
| 2015/0245559 A1 * | 9/2015 | Yang | .................. | A01D 34/6812 56/17.5 |
| 2016/0084361 A1 * | 3/2016 | Barendrecht | ....... | F16H 37/0813 475/343 |
| 2017/0074330 A1 * | 3/2017 | Zhang | ..................... | F16D 23/02 |
| 2017/0167588 A1 * | 6/2017 | Park | ........................ | F16D 11/16 |
| 2017/0265385 A1 * | 9/2017 | Yoshimura | ............. | F16D 11/14 |
| 2017/0265386 A1 | 9/2017 | Yoshimura et al. | | |
| 2018/0195560 A1 * | 7/2018 | Chino | ..................... | F16D 41/06 |
| 2019/0183040 A1 * | 6/2019 | Simmons | ........... | A01D 34/4162 |

FOREIGN PATENT DOCUMENTS

| | | |
|---|---|---|
| CN | 104798541 A | 7/2015 |
| CN | 105165262 A | 12/2015 |
| CN | 204994274 U | 1/2016 |
| EP | 2752107 A1 | 7/2014 |
| KR | 20110005640 U | 6/2011 |

OTHER PUBLICATIONS

Chinese Patent Office, Office Action in CN201510504564, dated Nov. 1, 2016.
State Intellectual Property Office of the P.R. China, International Search Report and Written Opinion in PCT/CN2016/077174, dated Jun. 20, 2016.

* cited by examiner

GARDEN TOOL POWER SYSTEM WITH AUTOMATIC WALKING FUNCTION

CROSS-REFERENCE TO RELATED APPLICATIONS

This application is a US national application of International Application No. PCT/CN/2016/077174 filed Mar. 23, 2016, which claims priority to CN Application Serial No. 201510504564.3, filed Aug. 18, 2015, the disclosures of which are hereby incorporated by reference in their entirety.

TECHNICAL FIELD

The present invention generally relates to a power system, and more particularly to a garden tool power system with automatic walking function which can be applied to self-propelled walking lawn mowers or other self-propelled walking appliances.

BACKGROUND

With the development of domestic and overseas animal husbandry and gardens, the lawn mower used as a common mechanical tool for mowing the lawn has a good prospect in the future.

New types of lawn mowers with a battery as a power system are widely accepted by the consumers due to low working noise, smooth and reliable operation, energy conservation and environment protection. However, this kind of lawn mower has a low work efficiency and is very labor-intensive because it is manually pushed or pulled by the operator to walk forward and back, especially when worked on a lawn with a certain gradient.

SUMMARY OF INVENTION

The aim of the present invention is to provide a garden tool system with automatic walking function to improve the work efficiency due to insufficient power when manually pulled or pushed by the operator during working.

In an aspect, a garden tool power system includes a motor, a reducer and a transmission shaft. The motor transmits power to the transmission shaft through the reducer to drive wheels provided on the transmission shaft to rotate. The reducer comprises a pinion connected to an output end of the motor and a gear engaged with the pinion. The transmission shaft includes left and right shafts connected with each other through a connecting shaft. The gear is mounted on the connecting shaft and has at least two guiding rods transversely located thereon and two centrifugal blocks located between the guiding rods. Each guiding rod has a spring surrounded therearound and each of the springs is located between the two centrifugal blocks and has two opposite ends respectively abutted against a corresponding portion of the centrifugal blocks. A fixing sleeve provided on a periphery of the centrifugal blocks is mounted on the transmission shaft and has buckle structures matching with the centrifugal blocks.

In an embodiment, the connecting shaft is respectively connected with the left and right shafts through transition fit.

In an embodiment, the gear engages with the connecting shaft through clearance fit.

In an embodiment, the pinion and the gear are arranged in a housing of the reducer, and the housing comprises left and right housings assembled together through a bolt, and the pinion is assembled to the left housing via a bearing, the left and right shafts are respectively connected to the left and right housings through corresponding bearings.

In an embodiment, the fixing sleeve comprises a left fixing sleeve housed in the left housing and a right fixing sleeve housed in the right housing, and the buckle structures are respectively defined on the left and right fixing sleeves.

In an embodiment, the buckle structures are convex portions symmetrically defined on inner walls of the left and right fixing sleeves.

In an embodiment, the left and right fixing sleeves are respectively mounted to the corresponding left and right shafts through corresponding positioning pins.

The garden tool can achieve automatic walking function or self-propelling walking function when the motor is working and can be manually pulled or pushed by the operator to walk forward and back when the motor is stopped. The garden tool can easily change the working status from the self-propelling walking status to the manually walking status. And the working efficiency of the garden tool is improved and the manufacturing cost is reduced based on the simple structure of the reducer.

DESCRIPTION OF EMBODIMENTS

Figure 1:
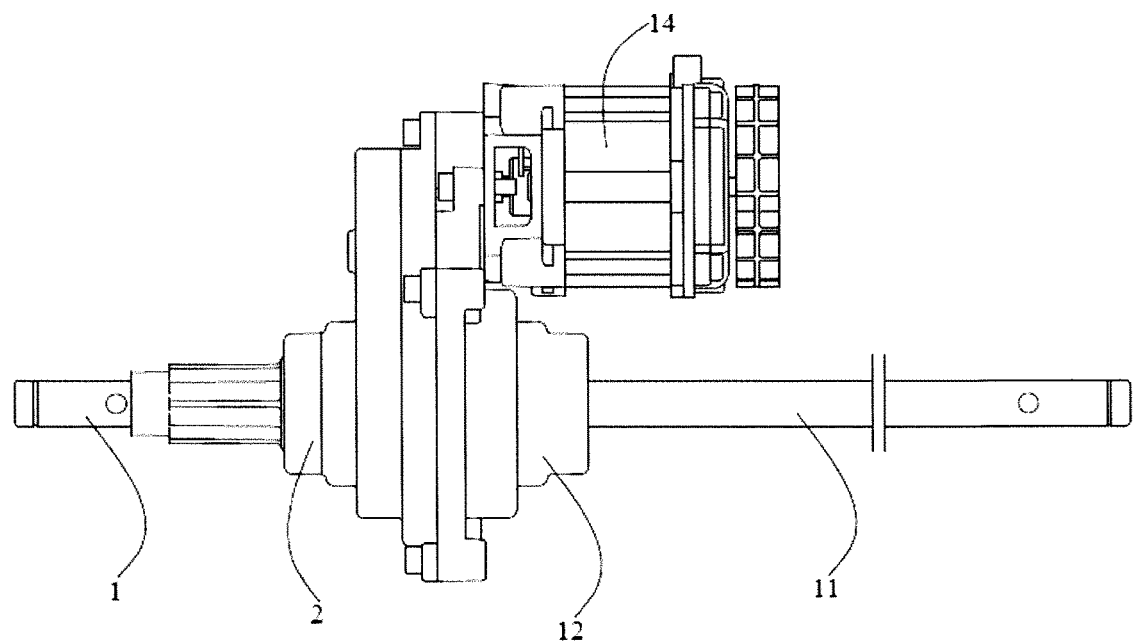
FIG. 1 is a schematic view of a garden tool power system with automatic walking function in accordance with the preferred embodiments of the present invention.

Reference will now be made to the drawing figures to describe the embodiments of the present disclosure in detail. In the following description, the same drawing reference numerals are used for the same elements in different drawings.

Figure 2:
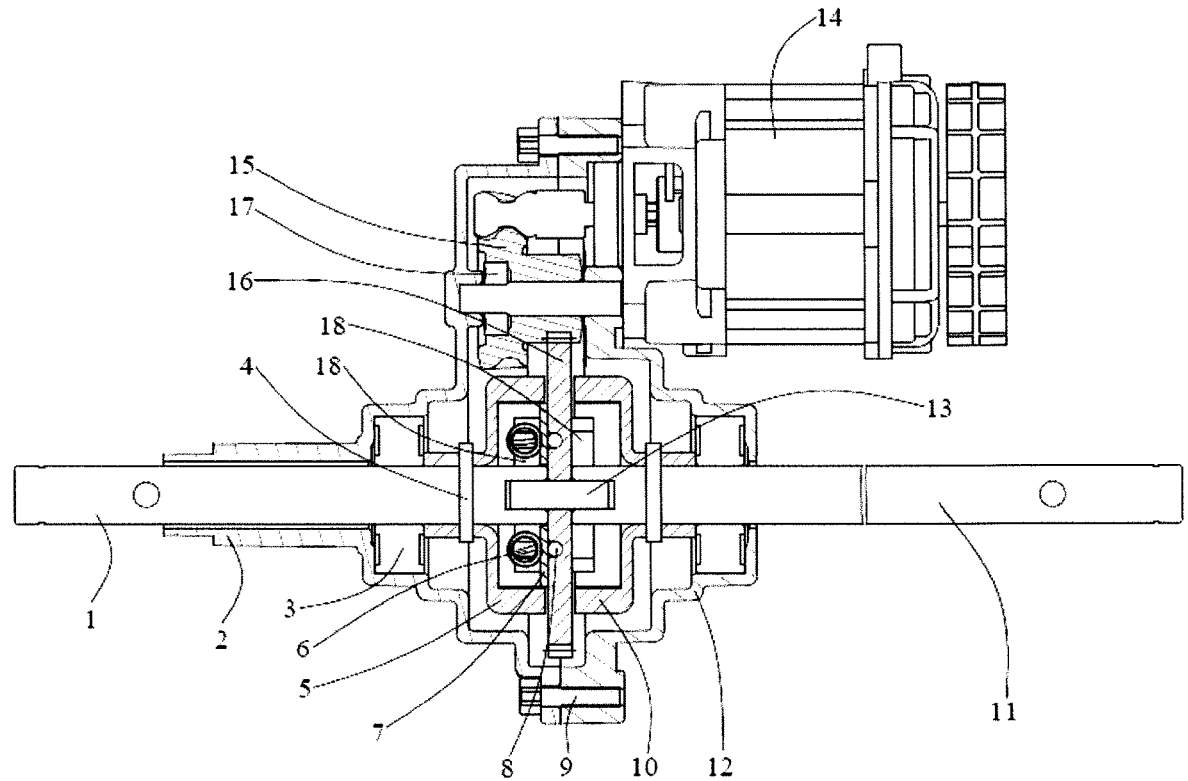
FIG. 2 is a cross-section view of the garden tool power system with automatic walking function shown in FIG. 1.

In one embodiment, referring to FIGS. 1-2, a garden tool power system with automatic walking function comprises a motor 14, a reducer and a transmission shaft. The motor 14 transmits power to the transmission shaft through the reducer to drive wheels provided on the transmission shaft to rotate. The reducer includes a pinion 15 connected to an output end of the motor 14 and a gear 16 engaging with the pinion 15 and mounted on the transmission shaft.

The garden tool power system is walked automatically when the wheels provided on the transmission shaft are driven to rotate by the power transmitted from the motor 14 to the transmission shaft through the reducer. The motor 14, the reducer and the transmission shaft together form a power system of the garden tool power system. The garden tool power system can be also manually pulled or pushed to walk forward and back by the operator without the power system.

Figure 5:
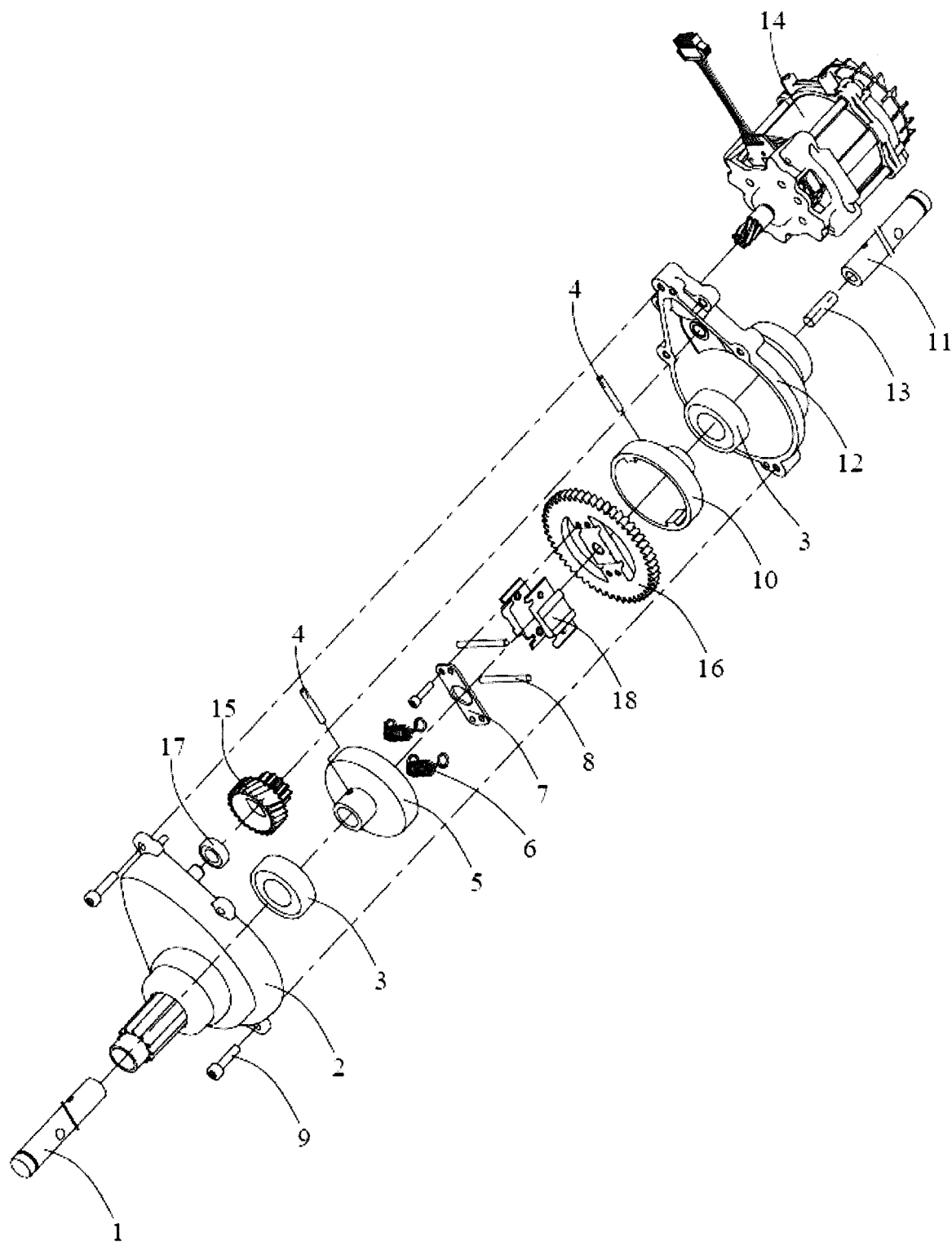
FIG. 5 is an exploded view of the garden tool power system with automatic walking function shown in FIG. 1.

Referring to FIG. 2 and FIG. 5, the reducer has a housing for receiving the pinion 15 and the gear 16. The housing includes left and right housings 2, 12 assembled together through a bolt 9. The pinion 15 is mounted to the left housing 2 through a bearing 17.

The pinion 15 is driven to rotate by the rotation of the motor 14. The actual speed of the lawn mower can be reduced by setting the teeth number Z1 of the gear 16 and the teeth number Z2 of the pinion 15 based on the rotating speed ratio N2/N1 being equal to the transmission gear ratio Z1/Z2, wherein N2 represents the rotating speed of the pinion 15 and N1 represents the rotating speed of the gear 16.

The transmission shaft comprises left and right shafts 1, 11 respectively assembled to the left and right housings 2, 12 of the reducer through corresponding bearings 3, and a connecting shaft 13 connecting the left shaft 1 to the right shaft 11. The connecting shaft 13 is respectively connected with the left and right shafts 1, 11 through transition fit to reduce the vibration of the garden tool power system while working.

The gear 16 is assembled on the connecting shaft 13 through clearance fit to prevent the connecting shaft 13 from transmitting torque to the gear 16 while rotating.

The gear 16 has at least two guiding rods 8 transversely arranged thereon and the guiding rods 8 are fixed to the gear 16 through a pressure plate 7. Two centrifugal blocks 18 are located between the guiding rods 8. Each guiding rod 8 has a spring 6 surrounded therearound and each of the springs 6 defines two opposite ends abutting against the corresponding portions of the centrifugal blocks 18. A fixing sleeve provided on the periphery of the centrifugal blocks 18 includes a left fixing sleeve 5 mounted on the left housing 2 and a right fixing sleeve 10 mounted on the right housing 12. The left and right fixing sleeves 5, 10 are respectively fixed to the left and right shafts 1, 11 through corresponding positioning pins 4.

Each of the left and right fixing sleeves 5, 10 is provided with buckle structures on the inner wall thereof. The buckle structures are convex portions symmetrically defined on the inner walls of the left and right fixing sleeves 5, 10. The convex portions match with the centrifugal blocks 18 in a jaw-clutch manner to transmit torque.

The operation process of the garden tool power system with automatic walking function is described as follows: The motor 14 transmits kinetic energy to the pinion 15 due to the gear transmission between the motor 14 and the pinion 15 when the motor 14 is started, and the pinion 15 transmits kinetic energy to the gear 16 through the gear transmission between the pinion 15 and the gear 16, and the gear 16 is driven to rotate by the pinion 15 when the kinetic energy is transmitted from the pinion 15 to the gear 16, but the connecting shaft 13 and the left and right shafts 1, 11 respectively connected to the connecting shaft 13 are not rotated based on the clearance fit between the connecting shaft 13 and the gear 16. The garden tool power system does not walk automatically at this point.

Figure 3:
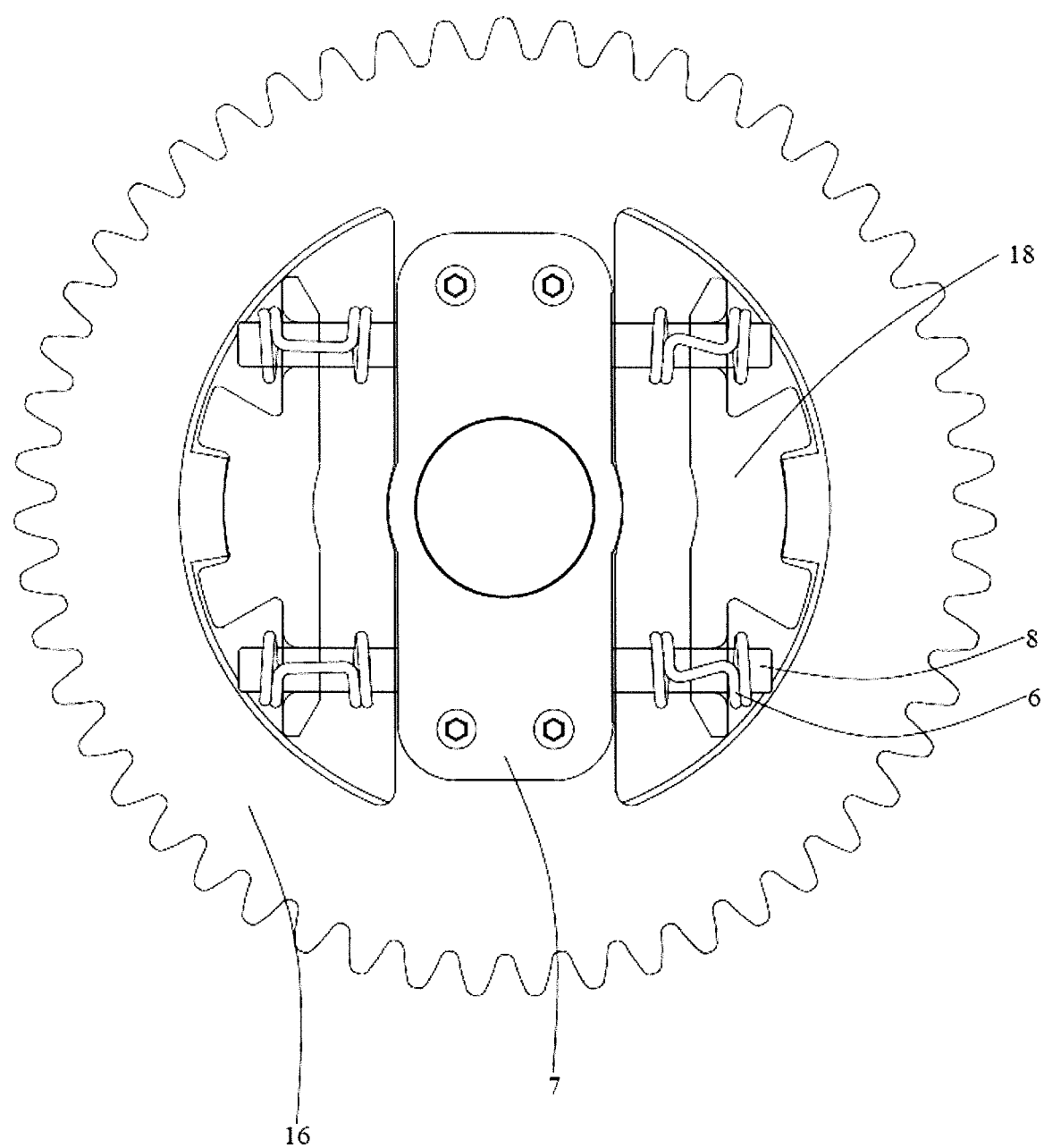
FIG. 3 is a schematic view of a gear shown in FIG. 2 when the garden tool is in the automatic walking working status.

However, the centrifugal blocks 18 mounted on the gear 16 centrifugally and outwardly move along the guiding rods 8 when overcoming the resistance from the springs 6 and are stopped moving when engaging with the convex portions of the left and right fixing sleeves 5, 10 in a jaw-clutch manner to transmit torque. The left and right shafts 1, 11 respectively drive the wheels provided thereon to rotate, so that the garden tool achieves the automatically walking function or self-propelling walking function, referring to FIG. 3. The centrifugal force of the centrifugal blocks 18 is bigger than the tensile force of the corresponding springs 6.

Figure 4:
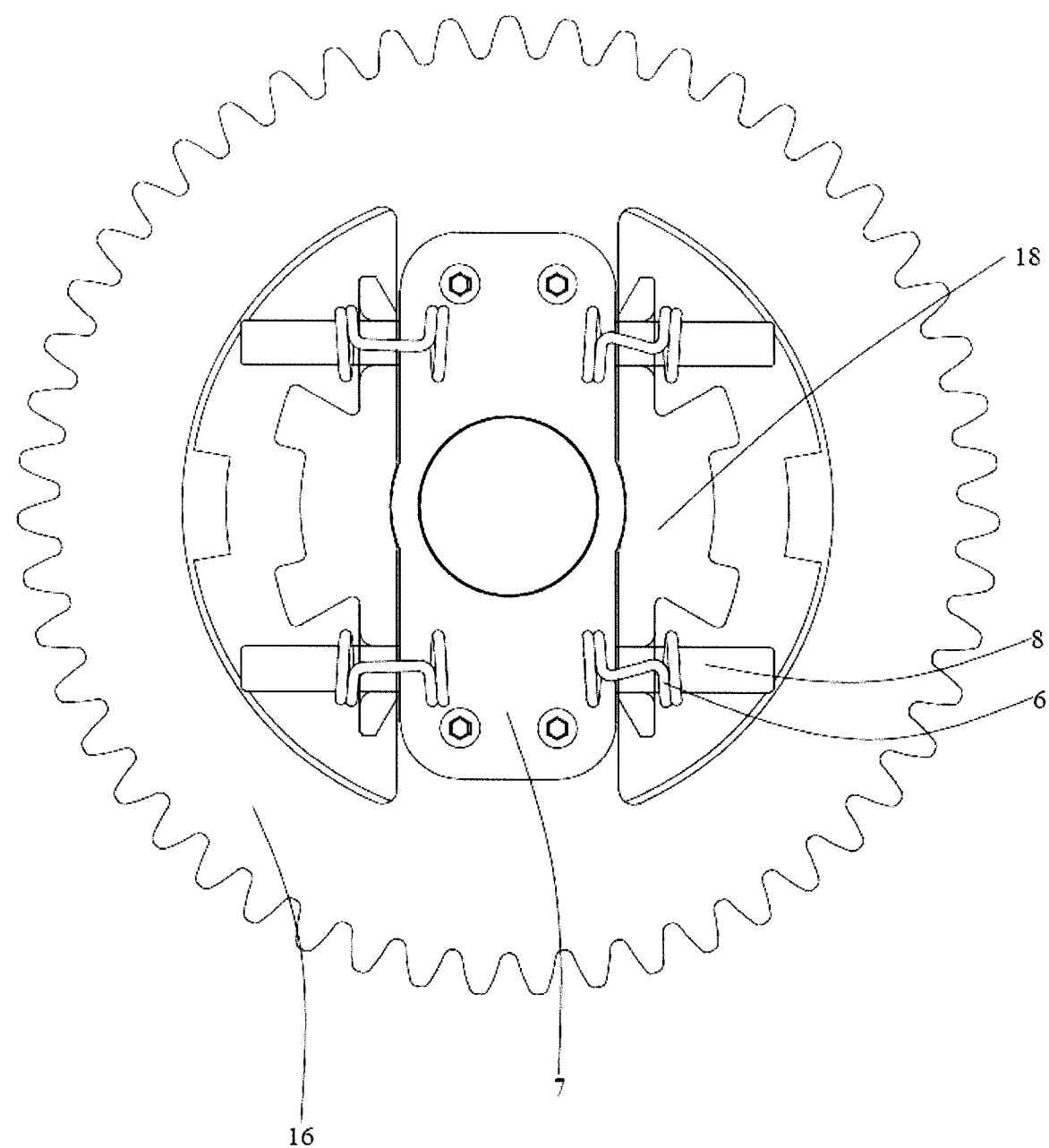
FIG. 4 is another schematic view of the gear shown in FIG. 2 when the garden tool is in the manually working status.

When the motor 14 is stopped, under the restoring force of the springs 6, the centrifugal blocks 18 can move backward to their initial positions along the guiding rods 8. And the centrifugal blocks 18 are separated from the fixing sleeves 5, 10 to stop transmitting torque, as shown in FIG. 4, so that the garden tool can be manually pulled or pushed by the operator to walk forward and back at this moment. In addition, when the garden tool is manually walked forward and back by the operator, the left and right shafts 1, 11 and the connecting shaft 13 can rotate to transmit torque due to no friction caused by the clearance fit between the gear 16 and the connecting shaft 13 and the transition fit between the connecting shaft 13 and the left and right shaft 1, 11, so as to separate the reducer from the motor 14.

In conclusion, the garden tool can achieve automatically walking function or self-propelling walking function when the motor 14 is working and can be manually pulled or pushed by the operator to walk forward and back when the motor 14 is stopped. In this manner, the garden tool can easily change the working status from the self-propelling walking status to manually walking status. And the working efficiency of the garden tool is improved and the manufacturing cost is reduced basing on the simple structure of the reducer.

It is to be understood, however, that even though numerous characteristics and advantages of preferred and exemplary embodiments have been set out in the foregoing description, together with details of the structures and functions of the embodiments, the disclosure is illustrative only; and that changes may be made in detail within the principles of present disclosure to the full extent indicated by the broadest general meaning of the terms in which the appended claims are expressed.

We claim:

1. A garden tool power system with automatic walking function comprising:
   a motor;
   a reducer; and
   a transmission shaft;
   wherein the motor transmits power to the transmission shaft through the reducer to drive wheels provided on the transmission shaft to rotate, and wherein the reducer includes a pinion connected to an output end of the motor and a gear engaged with the pinion, and wherein the transmission shaft includes left and right shafts connected with each other through a connecting shaft, and wherein the gear is mounted on the connecting shaft and has at least two guiding rods transversely located thereon and two centrifugal blocks located between the guiding rods, and wherein each of the guiding rods has a spring surrounded therearound and each of the springs is located between the two centrifugal blocks and has two opposite ends respectively abutted against a corresponding portion of the centrifugal blocks, and wherein a fixing sleeve provided on a periphery of the centrifugal blocks is mounted on the transmission shaft and has buckle structures matching with the centrifugal blocks.

2. The garden tool power system with automatic walking function, as recited in claim 1, wherein the connecting shaft is respectively connected with the left and right shafts through transition fit.

3. The garden tool power system with automatic walking function, as recited in claim 1, wherein the gear engages with the connecting shaft through clearance fit.

4. The garden tool power system with automatic walking function, as recited in claim 1, wherein the pinion and the gear are arranged in a housing of the reducer, and wherein the housing comprises left and right housings assembled together through a bolt, and wherein the pinion is assembled to the left housing via a bearing, and wherein the left and right shafts are respectively connected to the left and right housings through corresponding bearings.

5. The garden tool power system with automatic walking function, as recited in claim 4, wherein the fixing sleeve comprises a left fixing sleeve housed in the left housing and a right fixing sleeve housed in the right housing, and wherein the buckle structures are respectively defined on the left and right fixing sleeves.

6. The garden tool power system with automatic walking function, as recited in claim 5, wherein the buckle structures are convex portions symmetrically defined on inner walls of the left and right fixing sleeves.

7. The garden tool power system with automatic walking function, as recited in claim 5, wherein the left and right fixing sleeves are respectively mounted to the corresponding left and right shafts through corresponding positioning pins.

* * * * *